UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

PROCESS OF OXIDATION OF AROMATIC BODIES.

1,324,715.    Specification of Letters Patent.    Patented Dec. 9, 1919.

No Drawing.    Application filed May 25, 1918. Serial No. 236,552.

*To all whom it may concern:*

Be it known that I, CHESTER E. ANDREWS, a citizen of the United States, residing at Pittsburgh, Pennsylvania, have invented certain new and useful Improvements in Processes of Oxidation of Aromatic Bodies, of which the following is a specification.

The present invention relates to the oxidation of aromatic hydrocarbons containing either one or more side chains or consisting of a plurality of rings by the use of sulfuric acid with or without an additional oxidizing agent and with the intervention of a suitable catalyst, the latter consisting essentially of an oxid or another compound of either of the metals, molybdenum or vanadium. As examples of the hydrocarbons to be used xylene, toluene, naphthalene and anthracene are cited. The invention will be described in connection with the oxidation of anthracene with the production of anthraquinone.

In the preferred form of operation the anthracene is boiled with sulfuric acid containing an oxidizing agent such as sodium dichromate, chromic acid, manganese dioxid, or others, together with the catalyst which may preferably initially consist of vanadium oxid $V_2O_5$. The sulfuric acid may vary in strength within wide limits but 50% is preferred. In this way the reaction takes place with the formation of anthraquinone.

The reaction products may then be separated by diluting and cooling the mixture and filtering off the crystals of anthraquinone. The anthraquinone may be purified by any suitable means such as sublimation.

In place of pure anthracene, mixtures containing this can be used. The impurities seem to be completely oxidized giving a product which is essentially anthraquinone.

In some cases, instead of employing a single catalyst it is advisable to employ a mixture of the oxids or other compounds of the metals above mentioned. Also mixtures of either molybdenum or vanadium oxid with the oxid or other compound of one or more of the metals of the fifth or sixth groups of the periodic classification in many instances seem to act more efficiently as catalysts, than either the molybdenum or vanadium compounds alone. The catalyst may be in a state of coarse or fine division but preferably fine.

The strength of the sulfuric acid necessary varies considerably with the different hydrocarbons. In the case of naphthalene concentrated sulfuric acid or oleum is to be used and the oxidizing agent omitted, the catalyst alone being sufficient.

When ortho-xylene is employed as the starting material and sulfuric acid of about 50% used, with the catalysts above referred to, phthalic anhydrid can be produced.

In all of the examples the operation is carried out by boiling the mixtures, and the strength of the acid will of course determine the temperature.

In all the examples, the amount of the catalyst employed materially affects the speed of the reaction. The amount of the catalyst used may generally vary between the approximate limits of one to five per cent. The catalyst may be recovered for use in the treatment of a further batch of material if desired.

I am aware of the use of mercuric sulfate as a catalyst, for example, in the oxidation of naphthalene to produce phthalic anhydrid. The oxids of the metals herein specified possess the great advantage over mercuric sulfate (or materials from which this is derived) of being very much more active and efficient so that even when adding one per cent. by weight of one of these oxids, the reaction is effected more rapidly and more completely, than with a considerably larger amount of mercuric sulfate. Also the yield of oxidized product is greater when using the oxids mentioned.

What I claim is:—

1. A process of oxidizing organic hydrocarbons which comprises heating the aromatic hydrocarbon, sulfuric acid and a catalyst containing a compound of a metal of the herein described group comprising vanadium and molybdenum.

2. A process which comprises heating a mixture containing sulfuric acid, an oxidizable aromatic hydrocarbon and a catalyst comprising a vanadium compound.

3. A process of oxidation which comprises heating to about the boiling point, a mixture containing a polyring aromatic hydrocarbon, sulfuric acid and a catalyst comprising a compound of a metal of the herein described group consisting of vanadium and molybdenum.

4. A process of making phthalic anhydrid which comprises heating together a mixture comprising naphthalene and a concentrated sulfuric acid, in the presence of a vanadium oxid as a catalyst.

In testimony whereof I have affixed my signature.

CHESTER E. ANDREWS.